US011673356B2

(12) United States Patent
Zhang et al.

(10) Patent No.: US 11,673,356 B2
(45) Date of Patent: Jun. 13, 2023

(54) BUILDING DEVICE AND TIRE BUILDING METHOD THEREOF

(71) Applicant: TIANJIN SAIXIANG TECHNOLOGY CO., LTD, Tianjin (CN)

(72) Inventors: Xiaochen Zhang, Tianjin (CN); Bo Sun, Tianjin (CN); Songting Yang, Tianjin (CN); Jian Li, Tianjin (CN); Tao Rong, Tianjin (CN); Peng Zhang, Tianjin (CN)

(73) Assignee: TIANJIN SAIXIANG TECHNOLOGY CO., LTD, Tianjin (CN)

( * ) Notice: Subject to any disclaimer, the term of this patent is extended or adjusted under 35 U.S.C. 154(b) by 238 days.

(21) Appl. No.: 16/941,391

(22) Filed: Jul. 28, 2020

(65) Prior Publication Data
US 2021/0039343 A1    Feb. 11, 2021

(30) Foreign Application Priority Data

Aug. 7, 2019   (CN) .......................... 201910725564.4

(51) Int. Cl.
*B29D 30/00*   (2006.01)
(52) U.S. Cl.
CPC ....... *B29D 30/005* (2013.01); *B29D 30/0016* (2013.01); *B29D 2030/0038* (2013.01);
(Continued)
(58) Field of Classification Search
CPC .......... B29D 30/005; B29D 2030/0055; B29D 2030/204; B29D 2030/202; B29D 2030/205
See application file for complete search history.

(56) References Cited

U.S. PATENT DOCUMENTS

| 5,540,803 A * | 7/1996 | Miyamoto | ............. | B29D 30/08 |
| | | | | 156/111 |
| 2002/0179253 A1* | 12/2002 | Kimura | .................. | B29D 30/32 |
| | | | | 156/394.1 |

FOREIGN PATENT DOCUMENTS

| EP | 676277 A2 * | 10/1995 | ........... B29D 30/005 |
| JP | 2006116817 A * | 5/2006 | |
| JP | 2007112081 A * | 5/2007 | |

OTHER PUBLICATIONS

ESpacenet Translation of JP2007112081 (Year: 2022).*
ESpaceNet Translation of JP2006116817 (Year: 2022).*

* cited by examiner

*Primary Examiner* — Robert C Dye
*Assistant Examiner* — Alexander D Booth

(57) ABSTRACT

The invention discloses a tire building device and a tire building method. The tire building device includes a lateral-longitudinal-orthogonal 1 rail unit, a transferring ring, a carcass application unit, a bead placement unit, a belt application unit, a building unit, a shaping unit, and a tire unloading mechanism; the lateral and longitudinal orthogonal rail unit divides the tire building device into four areas, and also establishes the connection between the units through the transferring ring. The tire building method, including: 1) adhere the bead and tire carcass compound and then sent to the building unit; 2) send the belt compound to the building unit, 3) compound the carcass compound and belt compound into a carcass and sent to the shaping unit; 4) wind the carcass around the tread to form a green tire and sends it to the tire unloading mechanism for disassembly.

8 Claims, 2 Drawing Sheets

(52) U.S. Cl.
CPC ............... *B29D 2030/0044* (2013.01); *B29D 2030/0055* (2013.01)

BUILDING DEVICE AND TIRE BUILDING METHOD THEREOF

CROSS-REFERENCE TO RELATED PATENT APPLICATION

This application claims priority to and the benefit of CN201910725564.4, filed Aug. 7, 2020, entitled "BUILDING DEVICE AND TIRE BUILDING METHOD THEREOF," by Xiaochen ZHANG et al. The entire disclosure of the above-identified application is incorporated herein by reference.

Some references, which may include patents, patent applications, and various publications, are cited and discussed in the description of the present disclosure. The citation and/or discussion of such references is provided merely to clarify the description of the present disclosure and is not an admission that any such reference is "prior art" to the present disclosure described herein. All references cited and discussed in this specification are incorporated herein by reference in their entireties and to the same extent as if each reference was individually incorporated by reference.

TECHNICAL FIELD

The present invention relates to the field of tire manufacturing, and in particular, to a tire building device and a tire building method.

BACKGROUND OF THE PRESENT INVENTION

There are two main types of equipment for the OTR radial tire processing: one is a two-drum OTR radial tire building machine, and the other is a four-drum OTR radial tire building machine.

As shown in FIG. 1, the two-drum OTR radial tire building machine is an all-steel OTR radial tire building manufacturing equipment. This model consists of two units-a carcass/building unit and a belt unit. Carcass/building unit is used for carcass application, at the same time, it also takes in the belt compound made by the belt unit and complete the building work; the unit comprise of the primary servicing system (contains servicing device and let-off mechanism-conveying rubber components for the carcass application tooling), carcass/building power system, carcass/building tooling, rolling mechanism, base conveying system, bead placement device and tail stock (carcass/building tooling support mechanism). Belt unit is used for the application of belt compound, which consists of belt compound tooling, belt compound tooling power system, belt rolling mechanism, base conveying system and secondary servicing system (including servicing device and let-off mechanism—conveying rubber components for belt compound tooling). The belt compound transfer mechanism transfers the belt compound from the belt unit to the carcass/building unit, and transfers the final completed embryo from the carcass/building unit to the tire unloading mechanism. The whole machine also has a winding system that winds tread for the "carcass" of the carcass/building unit.

The two-drum OTR radial tire building machine has the advantages of: 1. Small operation area; 2. 4 operators needed, less than the people operating the "four-drum OTR radial tire building machine"; 3. The equipment is easy to operate and it's easy the operator to learn and master. 4. Quick change of tooling (only carcass application tooling and belt compounding tooling need to be replaced); 5. Sales price has advantages-compared to "four-drum OTR radial tire building machine".

Disadvantages of the two-drum OTR radial tire building machine are:

1. Production efficiency is low because that all rubber components are compound and built on the carcass/building tooling. Take 23.5R25 (tread winding) as an example, efficiency is 8-10 units/shift; 2. The accuracy of the compounding and the rolling quality could be adversely affected because the surface of the carcass/building tooling is a capsule elastic design; 3. The diameter of the two sides of the sleeve is not uniform (taking the centerline as the dividing line, the structures at two sides are unsymmetrical) because the carcass application tooling uses a triple sleeve telescopic structure, which affects the quality of the fit; at the same time, the rubber components "deviation" is prone to occur during the rolling process; 4. Layout position and the space occupation of the winding system results in a waste of overall machine, reducing the effective utilization of equipment area.

As shown in FIG. 2, the four-drum OTR radial tire building machine is an all-steel OTR radial tire building manufacturing equipment, which consists of three units-a carcass application unit, a building unit (in the form of a turntable), and a belt unit. Carcass application unit is used for compounding of carcass compound, which comprises of the primary servicing system (including servicing device and let-off mechanism-conveying rubber for the carcass application tooling), carcass application tooling power system, carcass application Combining tooling, carcass compound rolling mechanism, base conveying system, bead placement device and tailstock (carcass application tooling support mechanism). Belt unit is used for the application of belt compounds, which consists of belt compounding tooling, belt compounding tooling power system, belt rolling mechanism, base conveying system and secondary servicing system (including servicing device and let-off mechanism—conveying rubber components for belt compounding tooling). Building unit is used for tire building process and "carcass" treads winding work, which is composed of building tooling, building tooling power system, turntable mechanism, building tooling rolling mechanism and tailstock (building tooling support mechanism). The carcass compound is transferred from the carcass application unit to the building unit through the carcass compound transfer mechanism, and the belt application compound transfer mechanism transfers the belt cladding compound from the belt unit to the building unit, and transfer the final completed green tire from the building unit to the tire unloading mechanism; the whole machine also has a winding system that winds the tread of the "carcass" of the building unit.

Advantages of four-drum OTR radial tire building machine are: 1. the production efficiency is significantly higher than that of "two-drum OTR radial tire building machine" because all the processes are divided and completed on each tooling. Taking 23.5R25 (tread winding) as an example, production efficiency is 16-18/shift. 2. application accuracy, the stability of rubber components absorbing onto the drum surface, and the rolling quality are all improved significantly compared to "two-drum OTR radial tire building machine" because the tooling uses a hard surface design, and the surface is equipped with a vacuum suction cup.

Disadvantages of the four-drum OTR radial tire building machine are: 1. the production process could be "disordered" and production efficiency affected when the time for completing the steps on the two sides of the turntable is not matched because this solution uses the form of a turntable; 2, larger operation area: a lot of area waste is caused when the building tooling on the turntable reciprocates; 3, 5 operators needed, more than the number of operators for the "two-drum OTR radial tire building machine"; 4, the equipment covers a large area, operator moves back and forth for a longer distance to pick up rubber components, which wastes effective operation time; 5, tooling changing is slow (at least 3 sets of tooling need to be replaced); 6, Layout of the winding system and the occupied space causes a waste of part space of the machine, reducing effective utilization of equipment area; 7, there is no advantage in sales price, compared to "two-drum OTR radial tire building machine".

Therefore, a heretofore unaddressed need exists in the art to address the aforementioned deficiencies and inadequacies.

SUMMARY OF THE PRESENT INVENTION

An object of the present invention is to solve the above technical problems and provide a building device and a tire building method with higher production efficiency.

In order to solve the above technical problems, the present invention adopts the following technical solutions:

A building device, including a lateral-longitudinal-orthogonal rail unit, a transferring mechanism, a carcass application unit, a bead placement unit, a belt application unit, a building unit, a shaping unit and a tire unloading mechanism.

The lateral-longitudinal-orthogonal orbit unit includes orthogonal lateral rail and longitudinal rail.

The transferring mechanism includes a lateral transferring ring and a plurality of longitudinal transferring rings, the lateral transferring ring reciprocates along the lateral rail and the longitudinal transferring rings reciprocate along the longitudinal rail.

The carcass application unit is disposed at one end of the lateral rail and is used for rolling and compounding a carcass compound into a carcass compound.

The bead placement unit is longitudinally bridged on the lateral rail and is used to carry the bead.

The lateral transferring ring successively takes the bead and the carcass compound, and conveys the adhered bead and the carcass compound to the building unit.

The belt application unit, building unit, shaping unit, and tire unloading mechanism are arranged side by side in a lateral direction. The belt compounding unit, building unit, and shaping unit are located on the same side of the longitudinal rail with the longitudinal rail as a reference, and the tire unloading mechanism is located on the other side. With the lateral rail as a reference, the shaping unit and the tire unloading mechanism is located on the same side of the lateral rail, and the belt application unit is located on the other side of the lateral rail.

The belt application unit is used for compounding multiple belts into a belt compound, and then the belt compound is conveyed to the building unit through the longitudinal transferring rings.

The building unit is disposed at the other end of the lateral rail and is used to roll and compound the carcass compound with bead adhered and the belt compound to form a carcass, and then the carcass is delivered to the shaping unit through longitudinal transferring rings.

The shaping unit is used to wind the tread of the carcass to form a green tire, and the green tire is then conveyed to the tire unloading mechanism through the longitudinal transferring rings;

The tire unloading mechanism is used for unloading the green tire.

Further, the number of the longitudinal transferring rings is two and respectively is a belt compound transferring ring and a carcass and green tire transferring ring. The belt transferring ring is used for conveying the belt compound is disposed between the belt application unit and the building unit. The carcass and green tire transferring ring is disposed among the building unit, the shaping unit, and the tire unloading mechanism, and is used for conveying the carcass and the green tires.

Further, the carcass application unit includes a carcass application tooling, a carcass application tooling power system, a carcass application tooling rolling mechanism and a primary servicing system. The carcass application tooling is laterally disposed at one end of the lateral rail and is used for compounding, carrying conveying and expansion of the tire compound. The carcass application tooling power system provides power for rotation, expansion and contraction and lateral movement of the carcass application tooling. The primary servicing system conveys carcass components to the carcass application tooling and is rolled and compounded into a carcass compound by the carcass application tooling rolling mechanism.

Further, the primary servicing system is arranged longitudinally, the primary servicing system and the belt application unit are located on the same side of the lateral rail, and the primary servicing system is also located on the same side of the longitudinal rail as the tire unloading mechanism.

Further, the belt application unit includes a belt application tooling, a belt application tooling power system, a belt application tooling rolling mechanism, and a secondary servicing system. The belt compounding tooling is laterally arranged on one side of the longitudinal rail and is used for applying, carrying, conveying and expansion of the belt compound. The belt application tooling power system provides power for rotation, expansion and contraction and lateral movement of belt application tooling. The secondary servicing unit includes several servicing devices, and the plurality of servicing devices are sequentially arranged along the belt application tooling laterally and are used to convey the belt components for the belt compounding tooling and a plurality of belt components are rolled and compounded into a belt compound by the belt application tooling rolling mechanism.

Further, the belt application unit further includes a tread servicing mechanism, the tread servicing mechanism is arranged longitudinally and is separately disposed at the two sides of the secondary servicing system; the tread servicing mechanism is used to convey the pre-cut tread to the belt compounding tooling.

Further, the building unit includes a building tooling, a building tooling power system, and a building tooling rolling mechanism. The building tooling is disposed laterally at the other end of the lateral rail and at one side of the longitudinal rail, and is used for building, carrying and conveying of the carcass. The building tooling power system provides power for rotation and lateral movement of the building tooling, and the building tooling rolling mechanism is used to roll and compound the carcass compound with a bead adhered and the belt compound into a carcass.

Further, the shaping unit includes a shaping tooling, a shaping tooling power system, and a winding system. The shaping tooling is laterally disposed on one side of the longitudinal rail and is used for tread winding, carrying and conveying of the green tire. The shaping tooling power system provides power for rotation and lateral movement for the shaping tooling, and the winding system is used for winding the carcass around the tread and form a green tire.

A Tire building method based on the tire building device is including the procedures as follow:

1) supplying, by the primary servicing system, the carcass components to the carcass application tooling; rotating the carcass application tooling to compound the carcass components into a carcass compound by using in conjunction with the carcass application tooling rolling mechanism;

2) manually placing the bead on the bead placement unit and transfer it to a bead pick-up station; moving the lateral transferring ring to pick up the bead, and the bead placement unit is then reset; carrying, by the carcass application tooling, the carcass compound and moving laterally to the bead pick-up station and performing expansion so as to adhere the carcass compound and the bead; and then resetting the carcass application tooling to continue the next carcass application process; moving the lateral transferring ring together with the carcass compound with a bead to the pick-up station of the building tooling, extending the building tooling laterally and receiving the carcass compound with the bead adhered, and then resetting the lateral transferring ring and the building tooling and then the lateral transferring ring continues the next process of picking up the bead and carcass compound;

3) supplying, by the secondary servicing system, the belt components to the belt application tooling; expanding, rotating, and moving laterally the belt application tooling to sequentially compound a plurality of belt components into a belt compound by using in conjunction with the belt application tooling rolling mechanism, and then conveying, by the belt compound tooling, the belt compound to an initial station of a belt compound transferring ring, picking up the belt compound by the belt compound transferring ring, and the belt application tooling resets to continue the next application process of belt compound; longitudinally moving the belt compound transferring ring together with the belt compound to the pick-up station of the building tooling, extending the building tooling laterally and picking up the belt compound; and then resetting the belt transferring ring and the building tooling, and the belt compound transferring ring continues to do the next pick-up process of the belt compound;

4) rotating the building tooling to compound the carcass compound with bead adhered and the belt compound into a carcass by using in conjunction with the building tooling rolling mechanism; and longitudinally moving the carcass and green tire transferring ring to the pick-up station of the building tooling, moving the carcass to the pick-up station of the building tooling by the building tooling and being picked up by the carcass and green tire transferring ring, and then resetting the building tooling, and longitudinally moving the carcass and green tire transferring ring together with the carcass to the shaping tooling station;

5) laterally extending the shaping tooling and picking up the carcass, and then resetting the shaping tooling; rotating the shaping tooling to wind the tread for the carcass to shape the green tire by using in conjunction with the winding system; moving the green tire to the pick-up station of the shaping tooling by the shaping tooling, and being picked up by the carcass and green tire transferring ring, and then resetting the shaping tooling; longitudinally moving the carcass and green tire transferring ring together with the green tire to the pick-up station of the tire unloading mechanism;

6) Extending the tire unloading mechanism laterally and picking up the green tire for and resetting it after the green tire is removed; resetting the carcass and green tire transferring ring and continuing the next carcass pick-up process.

The beneficial effects of this invention are:

1. It maintains the customer's original process;
2. Compared with the two-drum OTR tire building machine, it can provide customers with stable and higher product quality;
3. High production efficiency: take 23.5R25 (tread wrapping) as an example, production: 27-29/shift;
4. Reduced floor space—the existing four-drum OTR tire building machine occupies an area of 776.2 $m^2$, the existing two-drum OTR tire building machine occupies an area of 529 $m^2$, the molding device occupies an area of 526.75 $m^2$, and the smallest space size improves the effectiveness Operating area to reduce waste;
5. Moderate selling price-benefiting from the reduced product floor area, the shortened conveying track and the cancellation of corresponding parts, the cost is slightly lower than the existing four-drum molding machine, which effectively improves the cost-effectiveness of the equipment.

BRIEF DESCRIPTION OF THE DRAWINGS

The accompanying drawings illustrate one or more embodiments of the present invention and, together with the written description, serve to explain the principles of the invention. Wherever possible, the same reference numbers are used throughout the drawings to refer to the same or like elements of an embodiment.

IN WHICH

Figure 1:
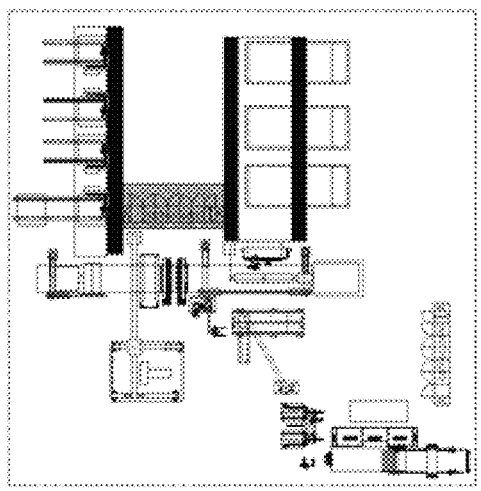
FIG. 1 is the schematic diagram of two drum OTR tire building device in the prior art.
Figure 2:
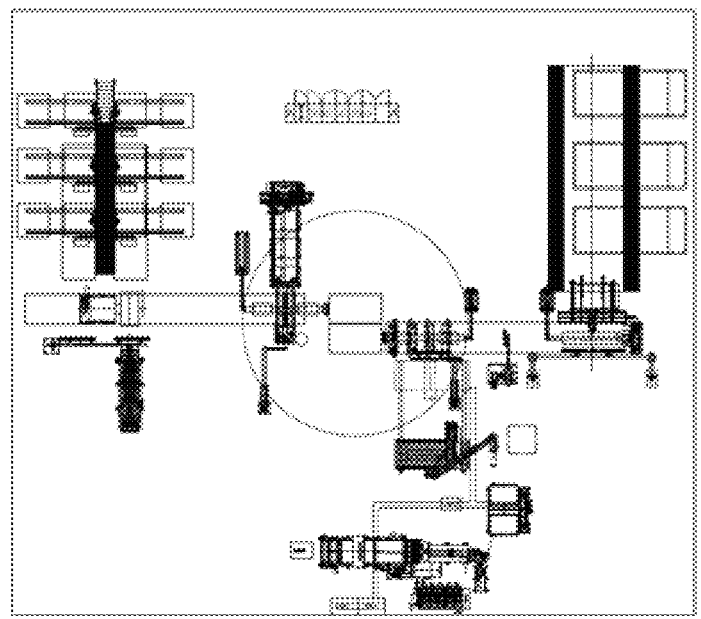
FIG. 2 is the schematic diagram of four drum OTR tire building device in the prior art.

1—carcass application tooling power system;
2—carcass application tooling; 3—carcass application tooling rolling mechanism;
4—lateral-longitudinal-orthogonal rail unit;
5—bead placement unit;
51—lateral rail;
6—lateral transferring ring;
7—Tailstock
8—primary servicing system
9—building tooling;
10-building tooling power system;
11-building tooling rolling mechanism;
12-shaping tooling;
13-shaping tooling power system;
14*a*- belt compound transferring ring
14*b*- carcass and green tire transferring ring;
15—belt application tooling;
16—belt application tooling power system
17—secondary servicing system;
18—winding system;
19—tire unloading mechanism;
20—tread servicing mechanism.

DETAILED DESCRIPTION OF THE PRESENT INVENTION

The present invention will now be described more fully hereinafter with reference to the accompanying drawings, in which exemplary embodiments of the present invention are shown. The present invention may, however, be embodied in many different forms and should not be construed as limited to the embodiments set forth herein. Rather, these embodiments are provided so that this disclosure is thorough and complete, and will fully convey the scope of the invention to those skilled in the art. Like reference numerals refer to like elements throughout.

The present invention will be described below in detail by embodiments with reference to the accompanying drawings.

Figure 3:
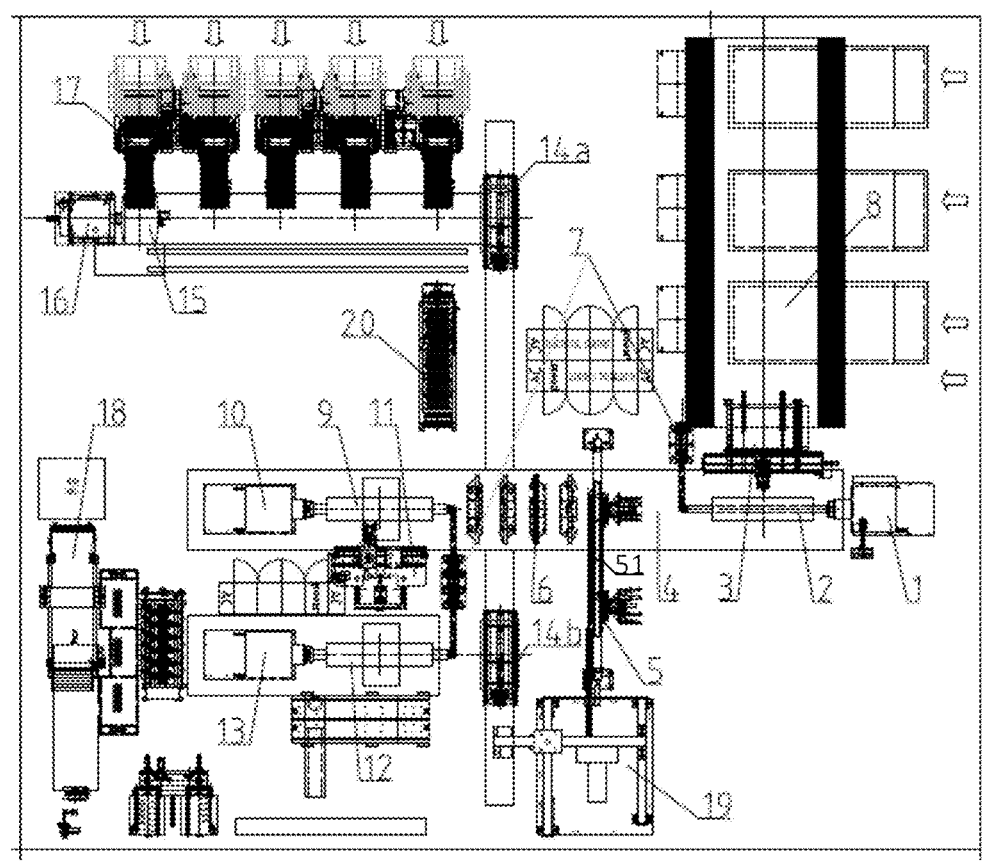
FIG. 3 is the schematic diagram of the top view of the building device according to the present invention.

As shown in FIG. 3, the present invention discloses a tire building device, including: a lateral-longitudinal-orthogonal rail unit 4, a transferring ring, a carcass application unit, a bead placement unit 5, a belt application unit, a building unit, a shaping unit and a tire unloading mechanism 19. The carcass application unit including a carcass application tooling 2, a carcass application tooling power system 1, a carcass application tooling rolling mechanism 3 and a primary servicing system 8; the belt application unit including a belt application tooling 15, a belt application tooling power system 16, a belt application tooling rolling mechanism and a secondary servicing system 17; the building unit including a building tooling 9, a building tooling power system 10 and a building tooling rolling mechanism 11; the shaping unit including a shaping tooling 12, tire shaping tooling power system 13 and a winding system 18.

The lateral-longitudinal-orthogonal rail unit 4 is two orthogonal lateral and longitudinal rails. The cross-shaped lateral-longitudinal-orthogonal rail unit 4 is used as a reference to divide the tire building device into four areas. As shown in FIG. 3, the area where the carcass application unit is located is defined as a first area, and the other areas are defined as a second area, a third area and a fourth area in the counterclockwise order. The belt application unit is mainly located in the second area, and the building unit and shaping unit are mainly located in the third area. The tire unloading mechanism 19 and the bead placement unit 5 are mainly located in the fourth area. In addition, the second and fourth area has reserved space for operator use, which is convenient for manual operation and material storage and transfer; whereas the first and third area are centralized equipment placement areas. The automation of these two areas is high, which can effectively increase the space utilization and avoid unnecessary waste of space. Such a reasonable layout makes the tire building unit compact in structure and small in area, which can increase the effective operating area and reduce waste.

The transferring mechanism includes a lateral transferring ring 6 and a plurality of longitudinal transferring rings, wherein the lateral transferring ring 6 reciprocates along a transverse track and is mainly used for the lateral conveyance of materials, and the longitudinal transferring rings reciprocate along the longitudinal rail and are mainly used for the longitudinal transfer of materials. The number of longitudinal transferring rings is two and is belt compound transferring ring 14a and carcass and green tire transferring ring 14b. The belt compound transferring ring 14a and carcass and green tire transferring ring 14b work in different regions of the longitudinal ra1, and can also improve work efficiency without interference. Specifically, the belt compound transferring ring 14a is provided between the belt application unit and building unit and is used for conveying belt compound. The carcass and green tire transferring ring 14b is provided in the tire building unit, the shaping unit and the tire unloading mechanism 19 and used for conveying the carcass, and green tire.

The bead placement unit 5 is longitudinally bridged on the lateral rail 51, which is mainly located in the fourth area. The bead placement unit 5 uses expandable and contractible support discs to carry the bead. The support disc can be moved longitudinally. When the bead is loaded, the support disc is on the outer side of the lateral rail 51, which provides a better manual operation space. After loading, move the bead to the top of the lateral rail 51 and wait for the lateral transferring ring 6 to pick it up.

In the carcass application unit, the carcass application tooling 2 is horizontally arranged at one end of the lateral rail 51 and adopts a tailstock 7 as a supporting structure. The carcass application tooling 2 can be reciprocated laterally along the lateral rail 51. The carcass application tooling 2 is used for the compounding, carrying, conveying and expansion of the carcass compound; and the carcass application tooling power system 1 is fixedly arranged at the tail end of the carcass application tooling 2, which provides power for rotation, expansion and contraction and lateral movement of the carcass application tooling. The primary servicing system 8 is longitudinally set in the first area. The carcass application tooling 2 conveys carcass compound. The carcass application tooling rolling mechanism 3 is set between the primary servicing system 8 and carcass application tooling 2. It is mainly responsible for rolling and compounding the carcass into carcass compound.

In the belt application unit, the belt application tooling 15 is set horizontally and the lower part is provided with a track to move laterally. The belt application tooling 15 is used for applying, carrying, conveying and expanding of the belt compound. The belt application tooling power system 16 is fixed to tail end of the belt application tooling 15, and provides power for rotation, expansion, contraction, and lateral movement of the belt application tooling 15. The secondary servicing system includes several feeding devices, and several feeding devices are sequentially set along the belt application tooling 15 laterally and are used to convey the belt components for the belt compounding tooling. The belt application tooling rolling mechanism is mainly responsible for rolling and compounding a variety of belt components into the belt compounds, which can be set in a position relative to the last feeding device, and finally rolling a variety of belt components; it can also be set on belt application tooling power system 16, so that the belt application tooling rolling mechanism moves with belt application tooling 15, and the Belt components can be rolled and laminated one by one in real time.

The belt application unit also includes a tread servicing mechanism 20. The tread servicing mechanism 20 is longitudinally located in the second area and is separated from the secondary servicing system 17 on both sides of the belt application tooling 15. The tread servicing mechanism 20 is used to convey the pre-cut tread to the belt compounding tooling 15. The setting of the tread servicing mechanism 20 can meet various tire models or types of production and processing technology (tread non-wrapping type tires). The tread servicing mechanism 20 allows the belt to bond the tread directly on the belt compound after the belt is applied to the compound, which can save the follow winding process of the subsequent shaping unit.

In the building unit, the building tooling 9 is horizontally arranged at the other end of the lateral rail 51 and adopts the tailstock 7 as a supporting structure. The building tooling 9 can be reciprocated laterally along the lateral rail 51. The building tooling 9 is used for the building, carrying and conveying of the carcass. The building tooling power system 10 is fixed at the tail end of the building tooling 9 and provides power for rotation and lateral movement of the building tooling 9. The building tooling rolling mechanism 11 is set on the side of building tooling 9, which is mainly responsible for rolling and laminating carcass compound with a bead adhered and the belt compound into a carcass.

In the tire shaping unit, the shaping tooling 12 is set horizontally and adopts the tailstock 7 as a supporting structure. The lower part of the shaping tooling 12 is provided with a track that can be moved laterally. The shaping tooling 12 is used for tread winding, carrying and conveying of the green tire. The shaping tooling power system 13 is fixed at the tail end of the shaping tooling 12 and provides the power for rotation and lateral movement of the shaping tooling 12. The winding system 18 is set in the third area and is mainly responsible for winding the carcass around the tread and forming a green tire.

The tire unloading mechanism 19 is located in the fourth area and installed on the ground. It is mainly responsible for disassembling the green tire transferred from the carcass and green tire transferring ring 14*b*.

A tire building method based on a tire building device includes the following steps:

1) Primary servicing system 8 supplies carcass compound to the carcass application Tooling 2, and the carcass application tooling 2 rotates to compound carcass compound into a carcass compound by using in conjunction with the carcass application tooling rolling mechanism;

2) Manually place the bead on the bead placement unit 5 and convey to the bead pick-up station. The lateral transferring ring 6 moves and picks up the bead, and the bead placement unit 5 resets. The carcass application tooling 2 carries the carcass compound and move laterally to the bead pick-up station and performing expansion so as to adhere the carcass compound and the bead, and then the carcass application tooling 2 is reset to continue the next carcass application process. The lateral transferring ring 6 carries the carcass compound together with the bead to the pick-up station of the building tooling, the building tooling 9 extends laterally and picks up the carcass compound with the bead adhered, and then the lateral transferring ring 6 and the building tooling 9 resets, and then the lateral transferring ring continues the next process of picking up the bead and carcass compound.

3) Secondary servicing system 17 supplies the belt components to the belt application tooling. The belt application tooling 15 expands, rotates and moves laterally to sequentially compound a plurality of belt components into a belt compound by using in conjunction with the belt application tooling rolling mechanism, and then the belt application tooling 15 conveys the belt compound to an initial station of a belt compound transferring ring 14*a*. The belt compound transferring ring 14*a* receives the belt compound. The belt application tooling 15 is reset to continue the next application process of belt compound. The belt compound transferring ring 14*a* moves together with the belt compound to the pick-up station of the building tooling, the building Tooling 9 extends laterally and picks up the belt compound, and then the belt compound transferring ring 14*a* and the building Tooling 9 reset, and the belt compound transferring ring 14*a* continues to do the next pick-up process of the belt compound.

4) The building tooling 9 is rotated to compound the carcass compound with bead adhered and the belt compound into a carcass by using in conjunction with the building tooling rolling mechanism 11. The carcass and green tire transferring ring 14*b* moves longitudinally to the pick-up station of the building tooling. The building tooling 9 conveys the carcass to the pick-up station of the building tooling and is picked up by the carcass and green tire transferring ring 14*b*. Then the building tooling 9 resets, and the carcass and green tire transferring ring 14*b* longitudinally moves together with the carcass to a pick-up station of the shaping tooling 12.

moving the carcass to the pick-up station of the building tooling by the building tooling and being picked up by the carcass and green tire transferring ring, and then resetting the building tooling, and longitudinally moving the carcass and green tire transferring ring together with the carcass to the shaping tooling station 5) The shaping tooling 12 extends laterally and picks up the carcass, then the shaping tooling 12 resets, the shaping tooling 12 rotates to wind the tread for the carcass to shape the green tire by using in conjunction with the winding system 18. The shaping tooling 12 sends the green tire to the pick-up station of the shaping tooling 12, and is picked up by the carcass and green tire transferring ring 14*b*. After that, the shaping tooling 12 is reset. The carcass and green tire transferring ring 14*b* carries the green tire longitudinally to the pick-up station of the tire unloading mechanism 19.

6) The tire unloading mechanism 19 extends laterally and picks up the green tire and resets after disassembling the green tire. The carcass and green tire transferring ring 14*b* resets and continues to the next carcass picking process.

Although the principle and implementations of the present invention have been described above by specific examples in the embodiments of the present invention, the foregoing description of the embodiments is merely for helping understanding the method of the present invention and the core concept thereof.

Meanwhile, various alterations to the specific implementations and application ranges may come to a person of ordinary skill in the art according to the concept of the present invention. In conclusion, the contents of this specification shall not be regarded as limitations to the present invention.

The foregoing description of the exemplary embodiments of the present invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A tire building device, comprising:
a lateral-longitudinal-orthogonal rail unit;
a transferring mechanism;
a carcass application unit;
a bead placement unit;
a belt application unit;
a building unit;

a shaping unit; and a tire unloading mechanism, wherein the lateral-longitudinal-orthogonal rail unit comprises an orthogonal lateral rail and a longitudinal rail;

the transferring mechanism comprises a lateral transferring ring and a plurality of longitudinal transferring rings, wherein the lateral transferring ring reciprocates along the lateral rail, and the longitudinal transferring rings reciprocate along the longitudinal rail;

the carcass application unit is disposed at one end of the lateral rail and is used for rolling and compounding carcass components into a carcass compound;

the bead placement unit is longitudinally bridged on the lateral rail and is used to carry a bead;

the lateral transferring ring successively takes the bead and the carcass compound, and conveys the adhered bead and the carcass compound to the building unit;

with the longitudinal rail as a reference, the belt application unit, the building unit, and the shaping unit are located on the same side of the longitudinal rail, and the tire unloading mechanism is located on the other side; with the lateral rail as a reference, the shaping unit and the tire unloading mechanism is located on the same side of the lateral rail, and the belt application unit is located on the other side;

the belt application unit is used for compounding multiple belts into a belt compound, and then the belt compound is conveyed to the building unit through the longitudinal transferring rings;

the building unit is disposed at the other end of the lateral rail and is used to roll and compound the carcass compound with bead adhered and the belt compound to form a carcass, and then the carcass is delivered to the shaping unit through longitudinal transferring rings;

the shaping unit is used to wind a tread to the carcass to form a green tire, and the green tire is then transferred to the tire unloading mechanism through the longitudinal transferring rings; and the tire unloading mechanism is used for unloading the green tire.

2. The building device according to claim 1, wherein the longitudinal transferring rings are a belt compound transferring ring and a carcass and green tire transferring ring, respectively;

the belt transferring ring is used for conveying the belt compound is disposed between the belt application unit and the building unit; and the carcass and green tire transferring ring are provided in the building unit, the shaping unit, and the tire unloading mechanism, which is used for conveying carcass and green tires.

3. The building device according to claim 2, wherein the carcass application unit comprises: a carcass application tooling;

a carcass application tooling power system;

a carcass application tooling rolling mechanism; and a primary servicing system; wherein the carcass application tooling is laterally arranged at one end of the lateral rail and is used for the compounding, carrying, conveying and expansion of the carcass compound;

the carcass application tooling power system provides power for rotation, expansion and contraction and lateral movement of the carcass application tooling; and the primary servicing system conveys carcass compound components to the carcass application tooling and is rolled and compounded into the carcass compound by the carcass application tooling rolling mechanism.

4. The building device according to claim 3, wherein the primary servicing system is arranged longitudinally; the primary servicing system and the belt application unit are located on the same side of the lateral rail; and the primary servicing system and the tire unloading mechanism are located on the same side of the longitudinal rail.

5. The building device according to claim 3, wherein the belt application unit comprises:

a belt application tooling;

a belt application tooling power system; and a belt application tooling rolling mechanism and a secondary servicing system, wherein the belt application tooling is laterally disposed on one side of the longitudinal rail and is used for applying, carrying, conveying and expanding of the belt compound;

the belt application tooling power system provides power for rotation, expansion, contraction, and lateral movement of the belt application tooling; and the secondary servicing unit includes a plurality of servicing devices; and several servicing devices are sequentially arranged along the belt application tooling laterally and are used to convey the belt components for the belt compounding tooling and a plurality of belt components are rolled and compounded into a belt compound by the belt application tooling rolling mechanism.

6. The building device according to claim 5, wherein the belt application unit further comprises a tread servicing mechanism; and the tread servicing mechanism is arranged longitudinally and is separately disposed at the two sides of the secondary servicing system; the tread servicing mechanism is used to convey a pre-cut tread to the belt compounding tooling.

7. The building device according to claim 5, wherein the building unit comprises:

a building tooling;

a building tooling power system; and a building tooling rolling mechanism, wherein the building tooling is disposed laterally at the other end of the lateral rail and is located on one side of the longitudinal direction and is used for the building, carrying and conveying of the carcass;

the building tooling power system provides power for rotation and lateral movement of the building tooling; and the building tooling rolling mechanism is used to roll and compound carcass compound with the bead adhered and the belt compound into the carcass.

8. The building device according to claim 7, wherein the shaping unit comprises:

a shaping tooling;

a shaping tooling power system; and a winding system, wherein the shaping tooling is disposed laterally on one side of the longitudinal rail and is used for the tread winding, carrying and conveying of the green tire;

the shaping tooling power system provides power for rotation and lateral movement for the shaping tooling; and the winding system is used to wind the carcass around the tread and form a green tire.

* * * * *